F. F. SKEEL.
ELECTRIC CONDUIT FITTING.
APPLICATION FILED FEB. 9, 1914.
1,170,690.
Patented Feb. 8, 1916.
2 SHEETS—SHEET 1.
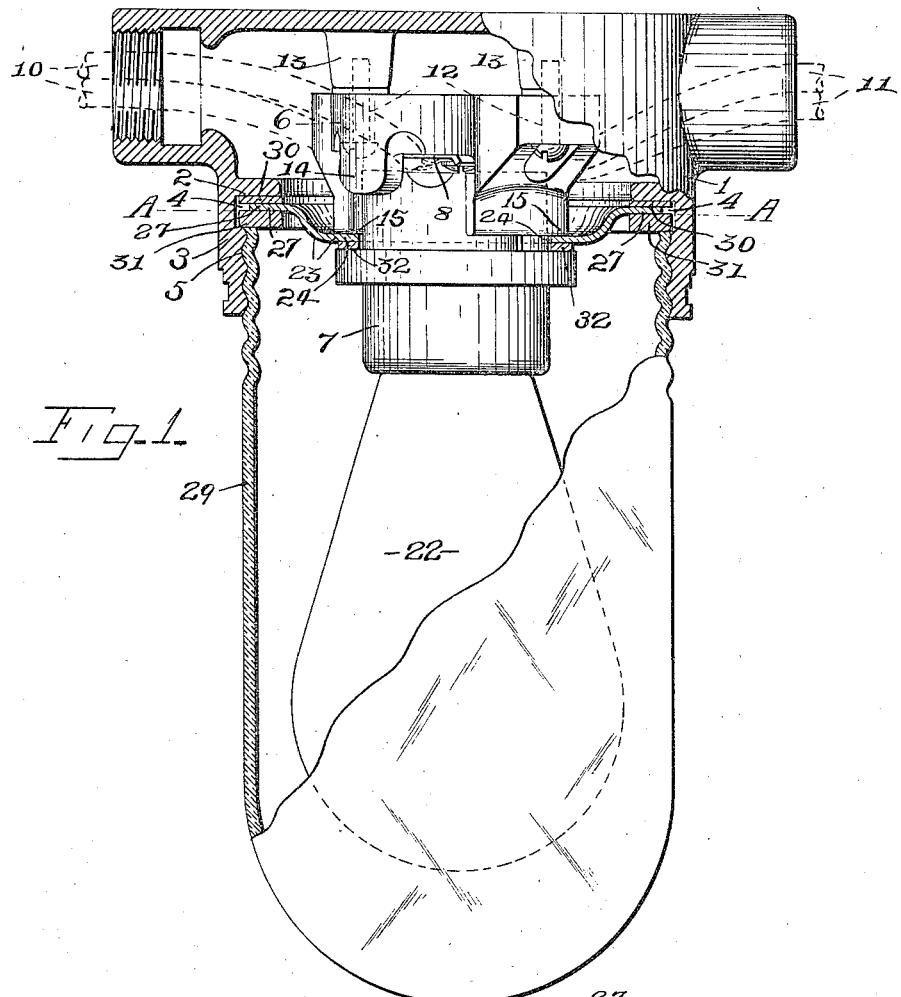
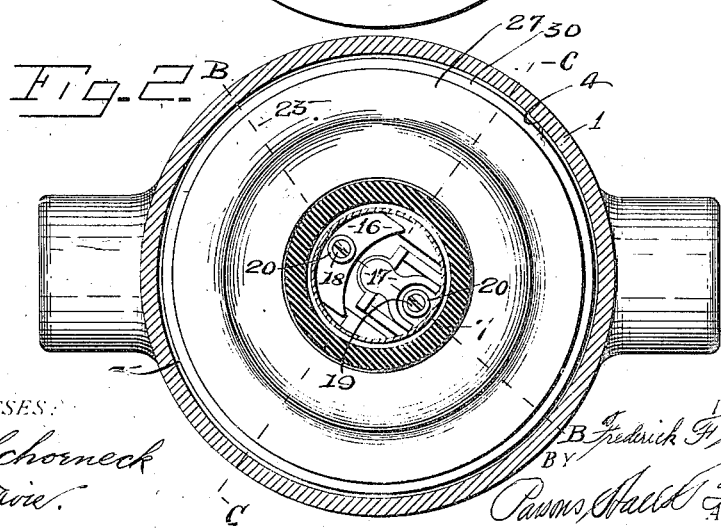
WITNESSES:
OCSchorneck
N. Davis
INVENTOR.
Frederick F. Skeel
BY
Parsons, Hall, Bodell
ATTORNEYS.

F. F. SKEEL.
ELECTRIC CONDUIT FITTING.
APPLICATION FILED FEB. 9, 1914.

1,170,690.

Patented Feb. 8, 1916.
2 SHEETS—SHEET 2.

WITNESSES:
CC Schorneck
Chas. H. Young

INVENTOR.
Frederick F. Skeel
BY Parson Hall Dodell
ATTORNEYS.

UNITED STATES PATENT OFFICE.

FREDERICK F. SKEEL, OF CHICAGO, ILLINOIS, ASSIGNOR TO CROUSE-HINDS COMPANY, OF SYRACUSE, NEW YORK, A CORPORATION OF NEW YORK.

ELECTRIC-CONDUIT FITTING.

1,170,690.   Specification of Letters Patent.   Patented Feb. 8, 1916.

Application filed February 9, 1914. Serial No. 817,510.

*To all whom it may concern:*

Be it known that I, FREDERICK F. SKEEL, a citizen of the United States, and a resident of Chicago, in the county of Cook and State of Illinois, have invented a certain new and useful Electric-Conduit Fitting, of which the following is a specification.

This invention has for its object the production of an electric conduit fitting for lamps and especially to constructions by which a cover for the box of the fitting is provided and held in position, and the invention consists in the novel features of construction hereinafter set forth and claimed.

In describing this invention, reference is had to the accompanying drawings, in which like characters designate corresponding parts in all the views.

Figure 3:
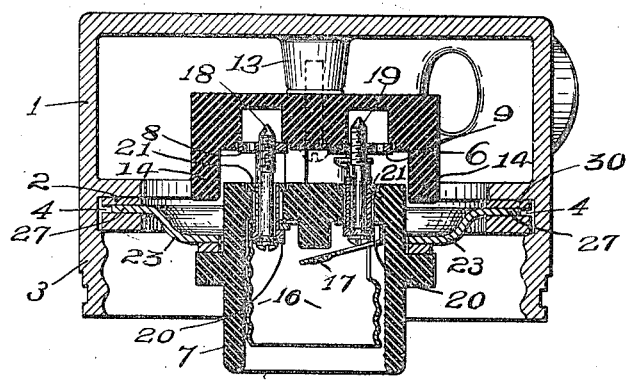
Figure 4:
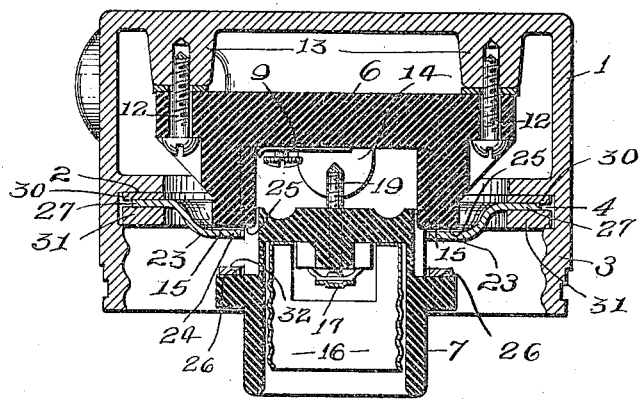

Figure 1 is a longitudinal sectional view, partly in elevation, of this fitting, the lamp being shown therein. Fig. 2 is a cross-sectional view on line A—A, Fig. 1. Figs. 3 and 4 are vertical sectional views on lines B—B and C—C, Fig. 2.

This electric conduit fitting comprises a box having an opening in one side and an internal seat concentric with the opening, an electrical appliance including a base and a cap, the base being fixed in the box and the cap mounted on the base and extending through the opening and being spaced apart from the seat, means for clamping the cap to the base, a cover plate for the open side of the box, the plate having a central opening for the appliance and having its inner margin clamped between the base and the cap of the appliance, and its outer margin opposed to the seat, and a globe secured to the box and arranged with its edge opposed to the outer margin of the plate and serving to press said margin toward the seat. Preferably, yielding rings or gaskets are interposed between the outer margin of the plate and the seat and the edge of the globe respectively.

1 is the box having an opening in one side, the box being formed with an internal annular seat 2 in the form of a flange concentric with the open side of the box. The box is preferably formed with an internally threaded cylindrical flange on the open side of the box, and the seat 2 is located at the base of the flange 3. Preferably, the flange 3 is recessed or formed with an internal annular groove 4 in advance of the seat 2, the groove being cut deeper than the threads of the surface 5 of the flange 3 and being located at the inner end of the threaded surface 5.

6 and 7 are, respectively, the base and cap of the electrical appliance, the base 6 having terminals 8, 9 which are connected to feed wires 10, 11 in the box 1; and the base is secured to the box by screws 12 threading into posts 13 depending from the bottom of the box. The base is formed with suitable diametrically opposite barriers 14 for separating the wires 10, 11 and with diametrically disposed opposing projections 15 extending to the outer side of the seat 2.

The cap 7 is provided with lamp socket terminals 16, 17 which are secured by screws 18, 19 threading into the base terminals 8, 9. The screws 18, 19 extend through, without having threaded engagement with, bushings or hollow screws 20, which extend through the bottom of the socket of the cap. The bushings have heads at their upper ends which coact directly with the terminals 16, 17, and said bushings thread at their lower ends into nuts 21. These screws 18, 19 also serve to clamp the cap toward the base.

22 is the lamp, and 23 designates the cover plate which has a central opening through which portions of the base 6 and cap 7 pass, and the inner margin 24 of said plate is clamped between opposing surfaces 25, 26 of the base 6 and cap 7. The outer margin 27 is opposed to the seat 2. The surfaces 25 of the base are at the ends of the projections 15, and the surface 26 of the cap 7 is one side of an annular flange 28 on the cap.

29 is a globe having a threaded cylindrical surface at its upper end which threads into the flange 3 and serves to clamp the plate 23 toward the seat 2. Preferably yielding rings or gaskets 30, 31 are interposed between the outer margin of the plate 23 and the seat 2 and the edge of the globe respectively, the rings, especially the outer ring 31, extending into the groove 4 in order that said ring 31 will be held from displacement when the globe is removed. The ring 31 also serves to form a water tight joint between the globe and the box 1. A washer or gasket 32 is also preferably located between the inner margin 24 and the cap.

This fitting is particularly advantageous in that a cover is provided for the box, which cover is held in position in a particularly simple and efficient manner.

What I claim is:—

1. An electric conduit fitting comprising a box having an opening in one side, an internal annular seat concentric with said opening, an electrical appliance including a base and a cap, the base being mounted in the box and the cap extending beyond the annular seat and including a lamp socket, means for clamping the cap to the base, a cover plate for the opening, the plate having a central opening for the appliance and having its inner margin clamped between the base and cap of said appliance, and its outer margin opposed to said seat, and a globe secured to the box and having its edge opposed to the outer margin of the plate and serving to press the same toward said seat, substantially as and for the purpose described.

2. An electric conduit fitting comprising a box having an opening in one side, an internal annular seat concentric with said opening, an electrical appliance including a base and a cap, the base being mounted in the box and the cap extending beyond the annular seat and including a lamp socket, means for clamping the cap to the base, a cover plate for the opening, the plate having a central opening for the appliance and having its inner margin clamped between the base and cap of said appliance, and its outer margin opposed to said seat, a globe secured to the box and having its edge opposed to the outer margin of the plate and serving to press the same toward said seat, and resilient rings interposed between the outer margin of the plate and the seat and the edge of the globe, substantially as and for the purpose specified.

3. An electric conduit fitting comprising a box having an opening in one side thereof, an internally threaded cylindrical flange projecting from the open side and an internal annular seat at the base of the flange, an electrical appliance including a base and a cap, the base being fixed in the box and the cap being mounted on the base and extending into said flange, the base and cap being spaced from the inner edge of the seat and from the threaded flange, and the cap having a lamp socket, means for clamping the cap to the base, a cover plate for the open side of the box, the plate having a central opening for the appliance and having its inner margin clamped between the base and the cap of said appliance, and its outer margin opposed to said seat, and a globe threading in the flange toward the outer margin of the cover plate and serving to clamp the plate toward the seat, substantially as and for the purpose set forth.

In testimony whereof, I have hereunto signed my name in the presence of two attesting witnesses, at Chicago, in the county of Cook, in the State of Illinois, this 30th day of December, 1913.

FREDERICK F. SKEEL.

Witnesses:
A. J. SELZER,
VAN N. MARKER.

Copies of this patent may be obtained for five cents each, by addressing the "Commissioner of Patents, Washington, D. C."